United States Patent Office 2,885,434
Patented May 5, 1959

2,885,434
NEW β-PHENYLACRYL ACIDS

Guido Cavallini and Elena Massarani, Milan, Italy, assignors to Francesco Vesmara S.p.A., Casatenovo (Como), Italy No Drawing. Application April 29, 1957
Serial No. 655,523

3 Claims. (Cl. 260—515)

The present invention relates to novel organic compounds and is more particularly concerned with certain para substituted β-phenylacrylic acids and with the process of the production thereof.

The novel compounds of this invention are the β-4-stilbene-acrylic and β-4-diphenylethane-acrylic acids and may be represented by the following formula:

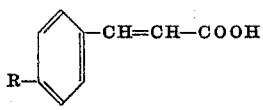

wherein R is a benzenoid hydrocarbon radical selected from the group consisting of styryl and ethylphenyl.

It is an object of the present invention to provide the β-phenylacrylic acids of the above formula, which possess physiological activity and may be used in the treatment of rheumatoid arthritis.

Another object of this invention is to provide a process for the production of these new compounds.

The para substituted β-phenylacrylic acids of the present invention demonstrated, in the usual experimental tests, an unexpected anti-inflammatory activity; this activity is similar to the one of cortisonic derivatives, chiefly when the comparison between two series of substances is made by oral administration.

According to the method of the present invention β-4-stilbene acrylic and β-4-diphenylethane-acrylic acids are prepared by the condensation of 4-stilbene-aldehyde and 4-diphenylethane-aldehyde respectively with malonic acid, in the presence of a condensing agent.

The starting aldehydes are substances which can be technically manufactured by easy and economical procedures. 4-stilbene-aldehyde can be obtained, as originally disclosed in our copending application Serial No. 513,604, filed June 6, 1955, now abandoned, by procedure which consists essentially of diazotizing para-amino-benzaldehyde and reacting the resulting p. formyl benzene diazonium salt with cinnamic acid.

The starting 4-diphenylethane-aldehyde is readily prepared from dibenzyl by passing through 4-chloromethyl-diphenylethane, as more fully disclosed in our copending application Serial No. 655,528, filed April 29, 1957.

In carrying out the process of the present invention one of the above mentioned aldehydes is converted to the corresponding acrylic acid by condensation with malonic acid, in the presence of an organic base, such as pyridine, piperidine and the like. The condensation step is conducted at a temperature between about 60° and about 120° C., usually in the presence of an organic solvent which is not reactive with the reactans and reaction products under the conditions of reaction.

Preferred solvents are aliphatic alcohols, such as methyl- and ethyl-alcohol, but other solvents as, for instance dioxane, tetrahydrofuran and the like may be used, if desired. Furthermore the same condensing agent may be employed as suitable solvent, so that the condensation step can be carried out indifferently whether in an alcoholic solution in the presence of pyridine, or simply in a pyridine solution. In this case the addition of a small amount of piperidine is of particular advantage.

At the end of the reaction period, the desired product, β-4-stilbene-acrylic or β-4-diphenylethane-acrylic acid, is usually separated from the reaction products as a stable crystalline solid which, recrystallized from a suitable solvent, and dried, gives a highly purified crystalline material.

The following examples are illustrative of the process and products of the present invention, but are not to be construed as limiting.

Example 1

4.16 g. of 4-stilbene-aldehyde, 2.64 g. of malonic acid, 50 cc. of ethanol and 0.5 cc. of pyridine were placed in a two-neck flask equipped with a reflux condenser and a mechanical stirrer. After heating under reflux for a period of about five hours, the mixture was cooled at room temperature and the solvent removed by distillation in vacuo. The solid residue was taken up with aqueous sodium hydroxide solution and the alkaline solution extracted several times with ether. The ethereal extracts were discarded and the aqueous solution was acidified to Congo red with dilute hydrochloric acid. The crystalline product which separated was filtered, washed with water and dried. After recrystallisation from acetic acid 3.24 g. of β-4-stilbene-acrylic acid, M.P. 256–258° C., were obtained with a yield of 65% of the theoretical based on the starting 4-stilbene-aldehyde.

Analysis.—Calcd. for $C_{17}H_{14}O_2$: C, 81.58; H, 5.64. Found: C, 81.20; H, 5.79.

The condensation step can be carried out in a methanol solution instead of ethanol one and piperidine may be also employed, as a condensing agent, instead of pyridine.

In the same manner as given above 4-diphenylethane-aldehyde was condensed with malonic acid to yield the corresponding β-4-diphenylethane-acrylic acid.

Example 2

A solution of 8.4 g. of 4-diphenylethane-aldehyde, 20 cc. of pyridine, 5 gr. of malonic acid and 2 cc. of piperidine was placed in a reaction flask equipped with a stirrer and a reflux condenser. The mixture was heated under reflux, with stirring, on an oil bath for a period of about seven hours then, after cooling, it was poured into 300 cc. of water and the aqueous solution acidified to Congo red with dilute hydrochloric acid. The precipitated product was filtered, washed with water and, after drying, crystallized from 95 percent alcohol, thus obtaining 5.4 gr. of β-4-diphenylethane-acrylic acid at melting point 198–200°. Yield, 55% of the theorical based on the starting 4-diphenylethane-aldehyde.

Analysis.—Calcd. for $C_{17}H_{16}O_2$: C, 80.92; H, 6.39. Found: C, 81.17; H, 6.83.

In a similar manner 4-stilbene-aldehyde was condensed with malonic acid to yield the corresponding β-4-stilbene-acrylic acid.

We claim:
1. A compound selected from the group consisting of β-4-stilbene-acrylic and β-4-diphenylethane-acrylic acids, represented by the formula:

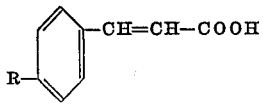

wherein R is a benzenoid hydrocarbon radical selected from the group consisting of styryl and ethylphenyl.

2. β-4-stilbene-acrylic acid of formula:

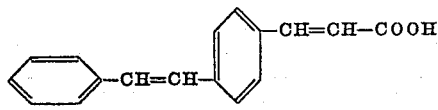

3. β-4-diphenylethane-acrylic acid of formula:

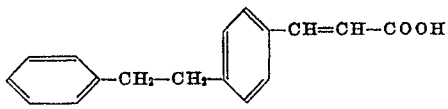

References Cited in the file of this patent

Natelson et al.: Chem. Absts. 30 p. 6753 (1936).
Wagner et al.: Synthetic Organic Chemistry, pp. 52.53 (1953).

UNITED STATES PATENT OFFICE

CERTIFICATE OF CORRECTION

Patent No. 2,885,434                      May 5, 1959

Guido Cavallini et al.

It is hereby certified that error appears in the above numbered patent requiring correction and that the said Letters Patent should read as corrected below.

In the grant, lines 2 and 12, and in the heading to the printed specification, line 4, name of assignee, for "Francesco Vesmara S.p.A.", each occurrence, read -- Francesco Vismara S.p.A. --.

Signed and sealed this 8th day of March 1960.

(SEAL)
Attest:

KARL H. AXLINE
Attesting Officer

ROBERT C. WATSON
Commissioner of Patents